United States Patent [19]

Nelson et al.

[11] Patent Number: 5,521,514
[45] Date of Patent: May 28, 1996

[54] BROKEN TINE DETECTOR FOR AGRICULTURAL MACHINES

[75] Inventors: George F. Nelson, Coon Rapids; David P. Andersen, Burnsville, both of Minn.

[73] Assignee: Loral Corporation, New York, N.Y.

[21] Appl. No.: 368,270

[22] Filed: Jan. 3, 1995

[51] Int. Cl.⁶ .......................... G01R 27/26; G08B 21/00
[52] U.S. Cl. .......................... 324/660; 340/679; 340/684; 56/10.2 J
[58] Field of Search ...................................... 340/684, 679; 324/519, 511, 555, 660, 772; 56/10.2 J, 400; 460/122; 361/214, 216

[56] References Cited

U.S. PATENT DOCUMENTS

| | | | |
|---|---|---|---|
| 4,035,696 | 7/1977 | Kessler | 340/679 |
| 4,412,212 | 10/1983 | Kolegraff et al. | 340/684 |
| 4,415,888 | 10/1983 | van der Lely | 340/684 |
| 4,758,788 | 7/1988 | Weiss et al. | 340/684 |
| 4,833,453 | 5/1989 | Twerdochlib | 340/679 |
| 5,052,171 | 10/1991 | Bich et al. | 56/364 |
| 5,444,966 | 8/1995 | Strosser | 56/10.25 |

Primary Examiner—Maura K. Regan
Attorney, Agent, or Firm—Glenn W. Bowen

[57] ABSTRACT

A broken tine detector for agricultural machines is provided for machines such as balers and forage harvesters. The tines form a first plate of a capacitor which rotates about the axis of a reel. The second plate of the capacitor may be provided by a back-plate which is located at the front of an agricultural machine adjacent to the ends of the tines and which is connected to machine ground. An alternate embodiment of the invention is devised by utilizing conductive strips on a tine guard. Each of the conductive strips may be utilized to form the second plate of the capacitor. The row of tines pass through individual slots in the tine guard so that a particular row in which the tine is broken may be detected. When a tine is broken the total capacitance between the tines and the back-plate will change and will be detected, and an indication will be supplied to an operator so that the operator may stop the machine and remove the tines.

2 Claims, 2 Drawing Sheets

1

BROKEN TINE DETECTOR FOR AGRICULTURAL MACHINES

BACKGROUND OF THE INVENTION

1. Field of the Invention

The invention is related to agricultural machines which utilize rotating tines, such as balers or forage harvesters. More particularly, the invention is related to the detection of broken tines on such machines.

2. Discussion of Background

Agricultural machines, such as balers and forage harvesters, typically employ reels which carry a plurality of tines. The tines are mounted in rows on a cylindrical reel which rotates around a horizontal axis to pick up the crop from the ground. The tines may or may not be protected by tine guards having gaps through which the tines project. Tine guards are utilized to protect unwanted material from entering the agricultural machine, and also to provide a measure of protection for the tines. However, even with such tine guards, the tines are subject to breaking. When this occurs the operator often will not be immediately aware of the fact that a tine has been broken. Broken tines on harvesters and balers can get mixed in the food product and may even be eaten by cattle, pigs, sheep and other farm animals.

At the present time when a tine becomes broken, it is common to use magnets to catch the broken tine. However, since the machinery is also magnetic, the tines are often not caught before they get carried into the grain or bales, and the operator will not be aware of the broken tine in time to stop and remove it. A pick-up tine mechanism with a guard mounting arrangement is shown in U.S. Pat. No. 5,052,171, issued Oct. 1, 1991, in the name of Gary L. Bich, et al.

SUMMARY OF THE INVENTION

In one embodiment of the invention, a capacitance monitoring circuit is electrically coupled to monitor the electrical capacitance between an elongated, curved metallic back-plate and the conductive rotating tines of an agricultural machine. Capacitances are thus developed which are referenced to the machine ground. The other plate, or plates, of the capacitor, or plurality of capacitors, as the case may be, is provided by the metallic tines. The back-plate may be a single plate that extends, as shown in FIG. 1, across the front of the machine. The back plate could also be formed by conductive bands so that each band corresponds to one row of tines to achieve row-by-row detection of broken tines. Under normal operation all of the capacitance will add to a nominal value. When a tine is broken there will be a change in the capacitance, which will provide an indication to the operator so that the operator will be able to stop the machine immediately and remove the tine. The invention may be implemented with or without a tine guard.

DESCRIPTION OF THE DRAWINGS

The invention is described by reference to the drawings in which.

DETAILED DESCRIPTION OF THE PREFERRED EMBODIMENT

Figure 1:
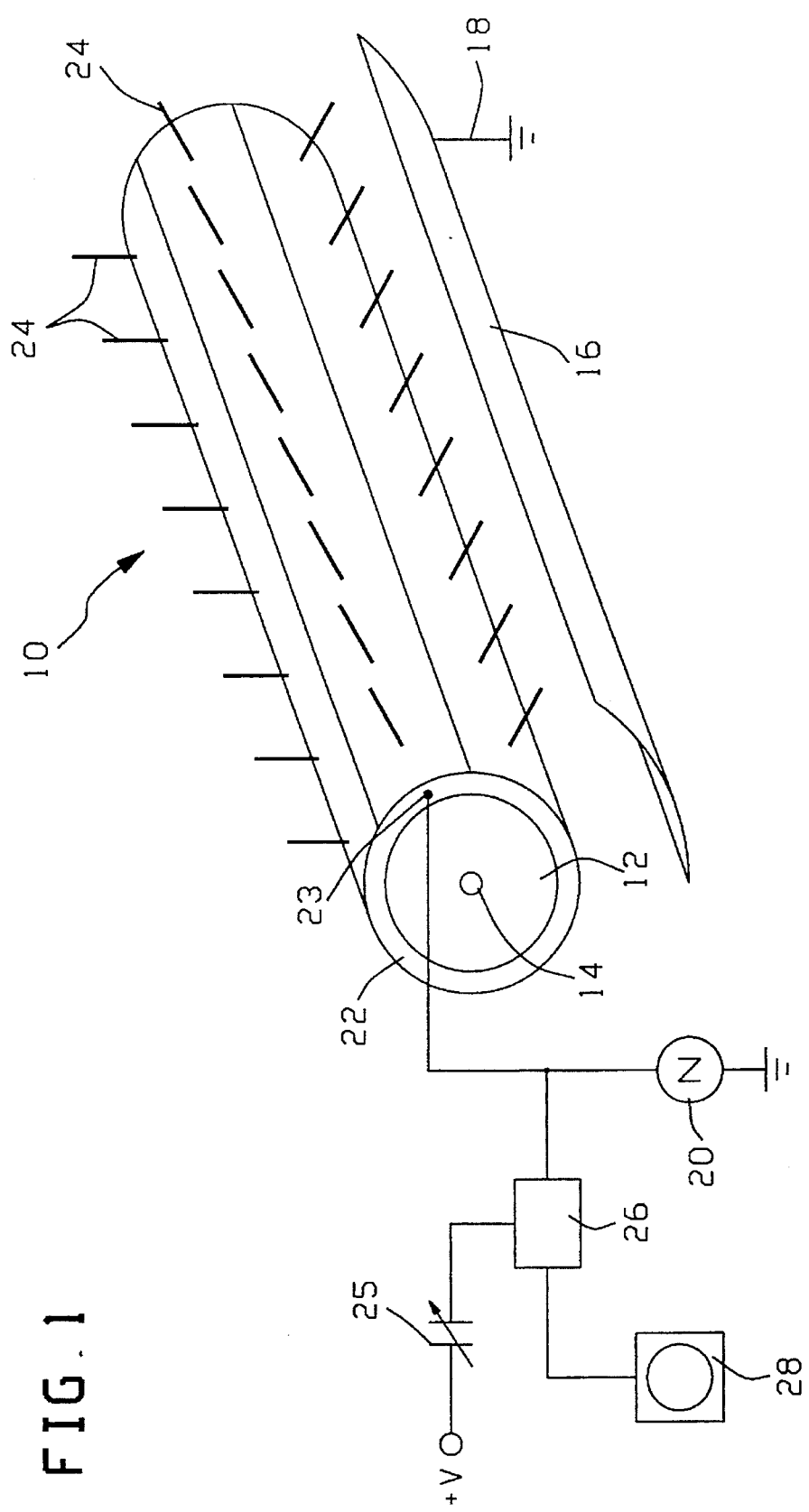
FIG. 1 is a schematic drawing of a first embodiment of the invention which utilizes a curved, electrically grounded back-plate.

An embodiment of the tine detector of the present invention is shown in FIG. 1 in which conductive tines 24 are mounted on a reel 12 which rotates about a horizontal axis 14. As the tines rotate they pass near a conductive curved back-plate 16 which is located on the front of an agricultural machine adjacent the end of the tines. The back-plate is electrically connected to machine ground through the cable 18. An RF source of energy 20, which is also coupled to machine ground, is connected to an electrically conductive cylinder 22 by a slide connector 23. The cylinder 22 is electrically coupled to the conductive tines 24 so that a total capacitance is formed between the back-plate 16 and the conductive tines 24 as they rotate on the axis 14.

All of the capacitance that exists between each of the tines will add to form a nominal total capacitance when there are no broken tines. The tines in general have a low surface area so that the capacitance to be measured is primarily a fringing capacitance from structural discontinuities or edges of the tines. When one of the tines is broken and falls off, there is a change in capacitance. A capacitance measuring circuit 26 may be of a number of known designs, including a conventional capacitance bridge in which an adjustable capacitor 25 is used to null out the bridge when all of the tines are present. When a tine becomes broken an indication warning light or other indicator 28 is provided to the operator.

Figure 2:
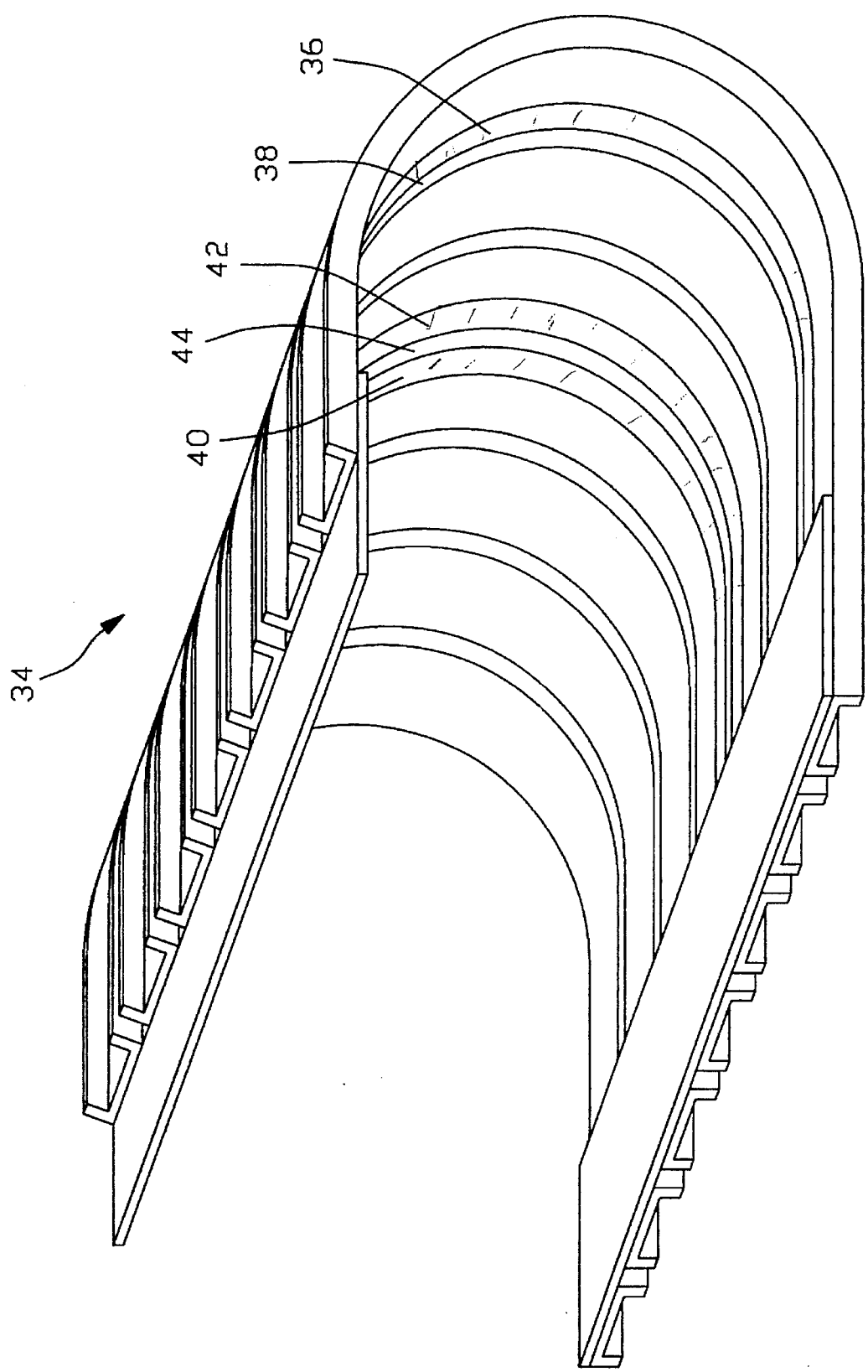
FIG. 2 is a perspective view of a second embodiment of the invention which shows a tine guard with electrically conductive electrode strips attached to it adjacent the slots through which the tines project.

An alternate version of the invention is shown in FIG. 2 in which a curved metallic tine mounting guard 34 is employed, for example, of the type described in the Bich et al. patent. In this embodiment a separate conductive strip, or strips, may be mounted adjacent the slots wherein the conductive strips replace the back-plate 16. The strips may be a single strip adjacent each slot of the tine guard. Such a strip may be provided on the inside of the tine guard. For example, the strip 36 adjacent the slot 38 forms one plate of a capacitor, and the tines of the row that rotate through the slot 38 form the other plate of the capacitor. Strips adjacent the slot 38 could also be mounted on the outside (not shown) of the tine guard, either with or without inside strips, such as strip 36.

Alternately, conductive strips for each slot may be arranged in pairs, such as the strips 40, 42 adjacent the slot 44 on opposite sides of it. Other strips (not shown) may again also be arranged in pairs on the opposite sides of each slot, either with or without the inside strips, or in other combinations that will be apparent to those skilled in the art. In the embodiment of FIG. 2 the individual electrical wires may extend to a separate capacitance bridge for each slot so that detection of a broken tine in any particular row may be obtained.

What is claimed is:

1. An apparatus for detecting rotating broken tines on agricultural machines comprising, a cylindrical drum to which said tines are secured in rows, electrically conductive means comprising a unitary curved back-plate located in a fixed position relative to said drum and adjacent the end of the tines as they rotate, electrical source means for applying an electrical voltage between the tines and said electrically conductive means, wherein said tines form a first side of a capacitance and said electrically conductive means form the second side of said capacitance, and sensing means coupled across both sides of said capacitance for sensing capacitance changes when one or more tines are broken.

2. An apparatus for detecting rotating broken tines on agricultural machines comprising, a cylindrical drum to which said tines are secured in rows, tine guard located in a fixed position relative to said cylindrical drum comprising, rows of slots each of which receives one of said row of the tines, electrically conductive strip means located adjacent said slots and the end of said tines as they rotate, electrical source means for applying an electrical voltage between the tines and said electrically conductive means, wherein said tines form a first side of a capacitance and said second side of said capacitance is formed by said electrically conductive means, and sensing means coupled across both sides of said capacitance for sensing capacitance changes when one or more tines are broken.

\* \* \* \* \*